July 26, 1960 W. SPINNLER ET AL 2,946,910
INFRARED IMAGE CONVERTER TUBES
Filed Nov. 9, 1954 2 Sheets-Sheet 1

July 26, 1960 W. SPINNLER ET AL 2,946,910
INFRARED IMAGE CONVERTER TUBES
Filed Nov. 9, 1954 2 Sheets-Sheet 2

United States Patent Office 2,946,910
Patented July 26, 1960

2,946,910

INFRARED IMAGE CONVERTER TUBES

Wilhelm Spinnler, Bonstetten Schachen, and Joseph Bruhin, Anton Schärli, Ernst Huber, and Walter Linder, Zurich, Switzerland, assignors to Albiswerk Zurich A.G., Zurich, Switzerland, a Swiss company Filed Nov. 9, 1954, Ser. No. 467,841

Claims priority, application Switzerland Nov. 9, 1953

6 Claims. (Cl. 313—65)

This invention relates to picture forming tubes and is particularly directed to infrared image converter tubes.

Infrared image converter tubes comprise an evacuated glass envelope containing a photo-sensitive cathode which is sensitive to infrared rays, a fluorescent screen and an electronic-optical system. This electronic-optical system of such a tube may consist of several metallic parts which not only must be aligned relative to the axis of the tube but also must be positioned at proper distances from each other and from the photo cathode and the fluorescent screen. In prior practice this was accomplished by individually supporting the parts of the electronic optical system on abutment faces formed on the inner surface of the glass wall of the tube. Since the fabrication tolerances of the glass parts of the tube are quite large the parts of the electronic optical system must be individually fitted and secured within the tube. This is a time consuming job. Mass production methods for fabricating the tube are desirable not only for economic reasons but also so that the tube parts are interchangeable. After installation of the electronic-optical system and after evacuation of the tube silver and cesium are vaporized within the tube and deposited on the cathode. This vaporizing process is a complicated procedure. If the process is not properly performed the tube is useless and if, as in the past, the electronic optical system is individually fitted to each tube it also is useless.

An object of the present invention comprises the provision of a novel infrared image converter tube construction which avoids the aforementioned difficulties of the prior art. In accordance with the tube construction of the present invention the electronic optical system is installed as a unit in the envelope of the glass tube and mechanically supported therein without any glass to metal fusion connections.

An infrared image converter tube made in accordance with the invention has two substantially cylindrical electrodes disposed one after the other co-axial with the electron path. The one electrode is clamped to a glass support fused to the tube wall and a cylindrical insulation unit connects this electrode to the other electrode which in turn is supported against the tube wall.

Other objects of the invention will become apparent upon reading the annexed detailed description in connection with the drawing in which.

Figure 1:
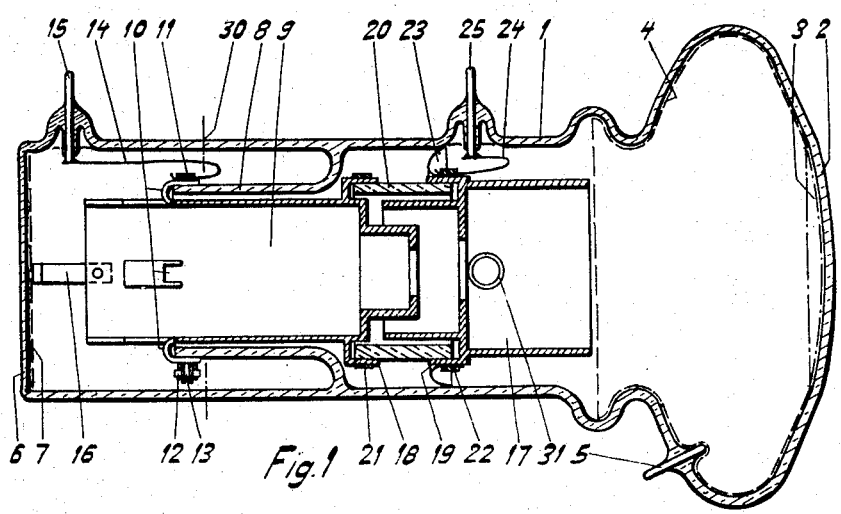
Fig. 1 is an axial section through an infrared image converter tube embodying the invention.
Figure 2:
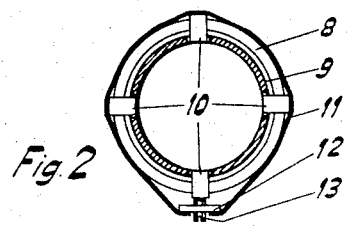
Fig. 2 is an end view illustrating electrode support assembly from the high potential end of the tube.

Referring now to Figs. 1 and 2 of the drawing, an infrared image converter tube is illustrated as comprising a glass envelope 1 having an optically polished glass plate 2 closing one end. A photo-sensitive cathode layer 3 is formed on the inside surface of the plate 2, this layer being sensitive to infrared rays and is illustrated by a dot and dash line. Connected to the periphery of the layer 3 is a metallic conducting layer 4 (illustrated by a dashed line). The layer 4 provides a shield against undesired rays from the outside and provides an electrically conducting connection between the cathode layer 3 and an electric terminal pin 5.

The end (bottom) of the tube glass envelope 1 opposite the cathode plate 2 is closed by a plate 6 the inside surface of which is covered by a fluorescent screen 7 (illustrated by a dashed line).

A cylindrical glass supporting flange 8 is fused to the cylindrical wall of the tube glass envelope 1 and a cylindrical electrode 9 preferably of aluminum is supported from the flange 8. The nature of the connection between the electrode 9 and flange 8 is best seen in Fig. 2. The electrode 9 has a plurality of circumferentially-spaced tabs 10 punched out therefrom, four such tabs being illustrated. Each tab 10 is bent over the cylindrical flange 8 and a metal band 11 is disposed around the flange 8 and over the tabs 10. The ends of the band 11 are welded to a plate 12 and a screw 13 is threaded into the plate 12 against one of the tabs 10 to tighten the band and hold all of the tabs against the flange 8. A contact strip 14 is connected under the band 11 to electrically connect the electrode 9 to an electric terminal pin 15. A pair of springs 16 (only one of which is illustrated) are connected to opposite sides of the electrode 9, each of these springs contacting the edge of the fluorescent screen 7 to maintain the screen at the same electric potential as the electrode 9.

A second electrode 17 is disposed co-axial with the electrode 9 and with the electron path, said electrodes being axially spaced from each other. The adjacent ends of the electrodes 9 and 17 have facing slotted flanges 18 and 19 respectively between which a cylindrical insulation member 20 is connected. The slotted flanges 18 and 19 are clamped about their ends of the insulation member 20 by metal bands 21 and 22 respectively. An annular channel member 23 of elastic sheet metal is connected under the band 22, the outer end of this elastic channel member 23 contacts the wall of the tube 1 to support the electrode 17. Also a contact strip 24 is connected under the band 22 to electrically connect the electrode 17 to an electric terminal pin 25.

Figure 5:
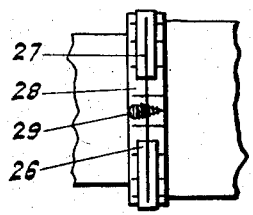
Fig. 5 is a side view illustrating a clamping connection between a cylindrical electrode and a cylindrical insulation member.
Figure 6:
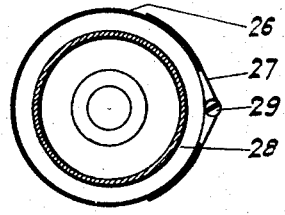
Fig. 6 is a transverse sectional view of Fig. 5.

A preferred construction of the band 21 and tightening means is illustrated in Figs. 5 and 6. As illustrated the band 21 comprises a metal strap 26 the ends of which are connected by a wire 27. The strap 26 and wire 27 are disposed around the slotted flange 18 of the electrode 9 and a tapered screw 29 is inserted under the wire 27 so that the wire engages the screw threads. Then by threading the screw 29 axially under the wire 27 the strap 26 and wire 27 are tightened about the flange 18 to connect the electrode 9 to the insulation member 20. The band 22 and its clamping means preferably have the same construction as that described for the band 21 and its clamping means. The clamping arrangement described for the bands 21 and 22 is advantageous where it is difficult to use a screwdriver in a direction radial of the tube. Obviously the band 11 and its clamping means may also have a similar construction.

The infrared image converter tube of Fig. 1 is assembled as follows: Initially the cathode plate 2 and the bottom plate 6, including the portion of the tube wall up to the point 30, are separated from the main part of the envelope of the tube 1. The metallic layer 4 is applied to the cathode end of the main part of the tube 1. The electronic-optical system, comprising the electrodes 9 and 17 and the insulation member 20, is assembled outside the tube into a mechanical unit by using the bands 21 and 22. This mechanical unit of the electronic-optical system is then inserted through the open cathode end of the tube 1. Then the tabs 10 of the electrode 9 are bent around the flange 8 and are clamped to this flange by the band 11 thereby securing the electronic-optical system within the tube 1.

In order that the tube 1 focuses sharply when in operation the electrode 9 must be accurately positioned relative to the screen 7 and the electrode 17 must be accurately positioned relative to the cathode layer 3. Since the construction of the present invention avoids glass to metal fusions these dimensions can be relatively easily maintained and adjusted during assembly to suit the dimensions of the glass wall of the tube 1. With the prior art practice each electrode had to be individually fused in position.

After the contact strips 14 and 24 have been secured in place, the bottom plate 6 to which the fluorescent screen 7 has been applied is secured to the portion of the tube and the plate 2 is likewise secured in position to close the ends of the tube. The tube 1 is then evacuated. The photo-cathode layer 3 may then be formed in the usual manner. For this purpose silver is vaporized from a device (not shown) inserted in the space between the electrode 17 and the cathode plate 2. The silver primarily deposits on the plate 2. In a similar manner cesium is vaporized in the space between the electrode 17 and the plate 2 and deposited on the plate 2. Cesium has the property of increasing the electronic emission by decreasing the electronic emission work function of the tube.

Because the vaporization of silver and cesium in the tube is a complicated process a bad tube cannot always be avoided. However after breaking the glass envelope of the bad tube, the entire electronic-optical system can be removed and installed in the galss envelope of another tube.

The method of operating the infrared image converter tube 1 briefly is as follows: The electrodes 9 and 17 including the fluorescent screen 7 are connected to electric potentials which are positive compared to the electric potential to which the photo-cathode 3 is connected. Also the positive potential of the electrode 9 and fluorescent screen 7 is higher than that of the electrode 17. If now infrared rays pass through the plate 2 and strike the photo-cathode 3, the cathode 3 emits electrons in proportion to the intensity of the rays. These electrons are accelerated and focused toward the fluorescent screen 7 by the electrodes 9 and 17 of the electronic-optical system, said electrons passing through the apertures 9a and 17a of said electrodes. The electrons strike the fluorescent screen 7 to illuminate the screen. Since the electrons strike the screen 7 with substantially the same distribution as when emitted by the cathode 3 they form a visible picture or image on the screen 7 which corresponds to the invisible infrared picture or image of the rays striking the cathode 3.

The usefulness of the infrared image converter tube depends to a large extent on its sensitivity and therefore it is important that even with low intensity of infrared radiation a bright visible picture on the screen 7 is desired. The brightness and intensity of the picture can be increased by applying high potentials to the electrodes 9 and 17 for greatly accelerating the electrons emitted by the cathode 3, since the brightness of the picture depends on the kinetic energy of the electrons striking the fluorescent screen 7. The relation between the positive potentials of the electrodes 9 and 17 must remain constant in order to obtain a sharply focused picture. It has been discovered that when using a tube such as the tube 1 if the potentials of the electrodes 9 and 17 are increased beyond certain values an electronic discharge occurs which brightens the entire screen 7 to cloud and blur the picture. Accordingly the potentials of the electrodes 9 and 17 and therefore the intensity of the picture on the screen 7 cannot be increased beyond the value at which this electronic discharge occurs to blur the picture.

This undesired electronic discharge and blurring of the picture at high potentials was found to result from the presence of a coating of cesium on the electrodes and on adjacent surfaces of the tube and that the electrode 17 because of its lower positive potential reacts as a cathode toward the higher potential electrode 9.

It is preferable, therefore, to take care that the surfaces inside the tube away from the cathode and on which the potential of the electrode 9 generates a high field intensity are shielded from the cesium vapor when cesium is being vaporized in the tube. From Fig. 1 it is apparent that most of the field lines running from the electrode 9 to the electrode 17 end on that part of the electrode 17 which lies on the left side of the aperture 17a of said electrode 17 and only a few lines pass through this aperture. Therefore it is primarily necessary that cesium be prevented from depositing on that part of the electrode 17 facing the electrode 9. Also however nonmetallic parts, such as the insulation member 20, which are subject to the field of the high potential electrode 9 can produce an electronic discharge if cesium is deposited thereon.

Figure 3:
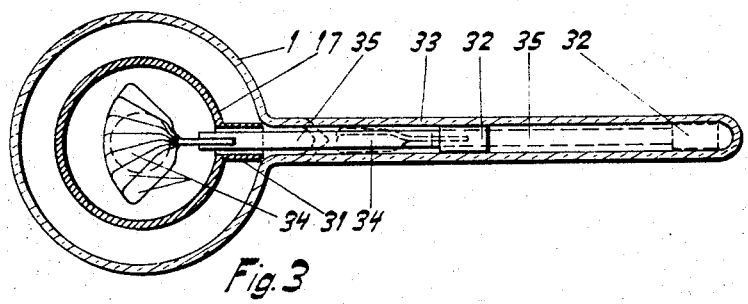
Fig. 3 is a sectional view illustrating apparatus for shielding parts of the tube from cesium vapor during the cesium vaporization step of the tube fabrication.

Accordingly, the apparatus provided for producing the tube 1 includes means illustrated in Fig. 3 for preventing the deposit of cesium on said surfaces of the electrode 17 and other parts strongly affected by the field of the high potential electrode 9.

Fig. 3 is a transverse sectional view through the tube on the axis of a tubular guide flange 31 extending laterally from the electrode 17, this flange 31 also being illustrated in Fig. 1. In Fig. 3 the dashed lines indicate the condition of the apparatus in its inoperative condition and the full lines show the apparatus in its operative condition.

An auxiliary glass tube 33 extends radially from the tube 1 in alignment with the tubular flange 31. A member having a piston-like part 32 of iron and a rod 35 is slidably disposed in the auxiliary tube 33. By means of a magnet on the outside of the auxiliary tube 33, the member 32 and its rod 35 can be shifted along said auxiliary tube. At the end of the rod 35 adjacent the tube 1 a plurality of elastic lamina or thin steel plates 34 are connected so that said plates tend to spread out like a fan. Prior to vaporization of the cesium this sliding part 32 is moved to the left (Fig. 3) so that the fan plates 34 are disposed within the electrode 17 and fan out in front of the aperture 17a of said electrode as shown in Fig. 3. With the aperture 17a closed in this manner the passage of cesium vapor to surfaces where the electrode 9 generates a high field strength is blocked. Passage of cesium vapor between the electrode 17 and the internal wall of the envelope of the tube 1 is blocked by the annular channel member 23. After vaporization of the cesium the part 32 and its rod 35 and fan 34 are slid back into the auxiliary tube 33 by a magnet. The auxiliary tube 33 is then sealed off and fused as indicated by dashed lines. Thus the sliding part 32 with its rod 35 and fan 34 can be used again, in the fabrication of additional tubes.

Figure 4:
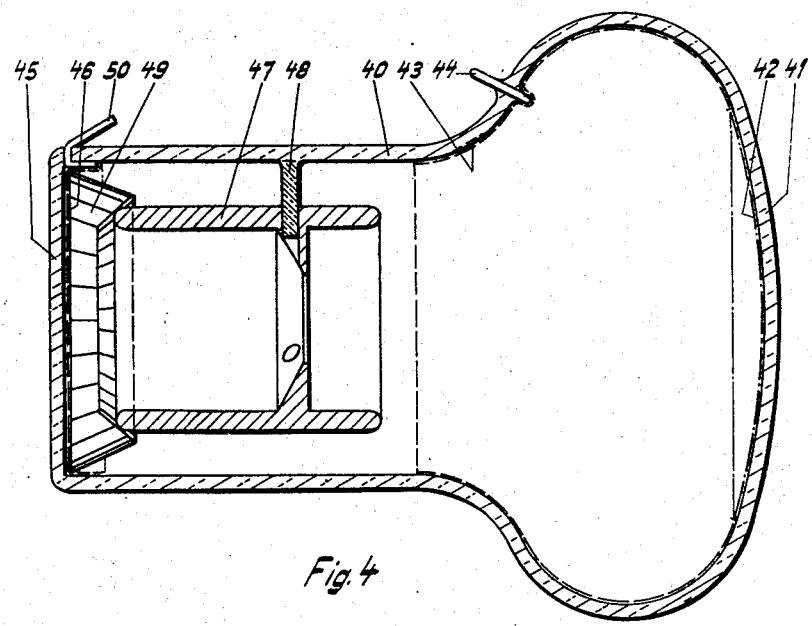
Fig. 4 is an axial sectional view through a modified form of infrared image converter tube.

Another example of an infrared image converter tube embodying the invention is illustrated in Fig. 4. As in the case of the tube 1 of Fig. 1, the tube 40 of Fig. 4 has a cathode plate 41 which closes one end of the tube. On the inside of the plate 41 an infrared-sensitive cathode layer 42 is deposited as indicated by the dot and dash line. The bottom of the tube 40 is closed by a plate 45 having a fluorescent screen 46 which extends to a metallic layer at the adjacent end of the internal surface of the tube 40. The electronic-optical system of the tube 40 consists of the single primarily cylindrical electrode 47, Three circumferentially-spaced glass rods 48 extend radially from the electrode 47. Initially these rods 48 can be radially shifted along radial holes extending through the electrode 47. During assembly the outer ends of these glass rods are fused with the inner wall of the tube 40 thereby securing the electrode 47 firmly in position. A sheet metal annular collar 49 is fitted between the fluorescent screen end of the electrode 47 and the adjacent end of the tube. The collar 49 is bent so that its two ends are disposed at an angle to each other and each end is slotted as illustrated. The collar 49 has three purposes; it serves to further support and center the electrode 47, it provides an electrical connection between the electrode 47 and the fluorescent screen 46 and the electric terminal pin 50, and during the process of coating the cathode plate 41 by vaporization of cesium the collar 49 prevents harmful contamination of the fluorescent screen with cesium.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. An image converter tube for converting infrared radiation into visible radiation, comprising a hermetically sealed elongated vitreous envelope having at one end a first wall portion transparent to infrared radiation and having at the other end a second wall portion transparent to visible radiation, an infrared-responsive photocathode covering said first wall portion to emit electrons substantially proportional to the intensity of said infrared radiation at the respective points of impingement; a fluorescent screen on said second wall portion within said tube in axially spaced relation to said cathode, said screen being responsive to impinging electrons to emit visible rays proportional thereto; a plurality of electron-optical electrodes of hollow-cylindrical shape coaxially aligned in said envelope between said cathode and said screen for focusing and accelerating the electrons emitted by said cathode onto said screen, said electrodes being rigidly joined with each other and forming together a single rigid mechanical structure; and an annular supporting member of metal substantially surrounding said electrode structure within said envelope and peripherally contacting said envelope, said member being radially elastic and engaging said electrode structure to maintain it in a given position relative to said envelope.

2. An image converter tube for converting invisible radiation into visible radiation, comprising a hermetically sealed elongated vitreous envelope having at one end a wall portion transparent to the invisible radiation; a photocathode extending in said envelope over an area corresponding to that of said wall portion and being responsive to the impinging invisible radiation to emit electrons substantially proportional to the intensity of said radiation at the respective points of impingement; a fluorescent screen disposed at the other end of said envelope and axially spaced within said envelope from said cathode, said screen being responsive to impinging electrons to emit visible rays proportional thereto; an electron-optical electrode structure of annular shape coaxially arranged in said envelope between said cathode and said screen for focusing and accelerating the electrons emitted by said cathode onto said screen, said electrode structure forming a single rigid mechanical unit and having three angularly spaced supporting rods each being fixedly attached at one end thereof to the inner surface of said envelope and extending into one of said respective openings of said electrode structure to support the same; and a radially elastic annular supporting member substantially surrounding an end portion of said electrode structure in axially spaced relation to said openings, said member engaging both the inner surface of the envelope and said end portion of said electrode structure to maintain said structure in a given position with respect to said envelope.

3. An image converter tube for converting invisible radiation into visible radiation, comprising a hermetically sealed elongated vitreous envelope having at one end a wall portion transparent to the invisible radiation; a photocathode extending in said envelope over an area corresponding to that of said wall portion and being responsive to the impinging invisible radiation to emit electrons substantially proportional to the intensity of said radiation at the respective points of impingement; a fluorescent screen disposed at the other end of said envelope and axially spaced within said envelope from said cathode, said screen being responsive to impinging electrons to emit visible rays proportional thereto; an electron-optical electrode structure of substantially cylindrical shape arranged in said envelope between said cathode and said screen, said electrode structure having one open end portion directed substantially toward said cathode, the other open end portion of said electrode structure being substantially directed toward said screen for focusing the electrons emitted by said cathode and directing the electrons towards said screen, whereby said screen produces a visible image of the rays of invisible radiation impinging on said cathode; and a frusto-conical supporting member of metal substantially surrounding one of said end portions of said electrode structure, said member having a reentrant portion and being arranged within said envelope with said reentrant portion engaging said one end portion of said electrode structure and the other end of said supporting member engaging said screen and the inner surface of said envelope to maintain said electrode structure in a given position with respect to said envelope.

4. An image converter tube for converting invisible radiation into visible radiation, comprising a hermetically sealed elongated vitreous envelope having at one end a wall portion transparent to the invisible radiation; a photocathode extending in said envelope over an area corresponding to that of said wall portion and being responsive to the impinging invisible radiation to emit electrons substantially proportional to the intensity of said radiation at the respective points of impingement; a fluorescent screen disposed at the other end of said envelope and axially spaced within said envelope from said cathode, said screen being responsive to impinging electrons to emit visible rays proportional thereto; an electron-optical electrode structure of substantially cylindrical shape arranged in said envelope between said cathode and said screen, said electrode structure having one open end portion directed substantially toward said cathode, the other open end portion of said electrode structure being substantially directed toward said screen for focusing the electrons emitted by said cathode and directing the electrons towards said screen, whereby said screen produces a visible image of the rays of invisible radiation impinging on said cathode, said electrode structure having three angularly spaced substantially radially directed openings; three angularly spaced supporting rods each being fixedly attached at one end thereof to the inner surface of said envelope and passing into one of said openings of said electrode structure to support the same; and a frusto-conically shaped supporting member substantially surrounding said other end portion of said electrode structure, said member having a reentrant portion and being arranged within said envelope with said reentrant portion engaging said other end portion of said electrode structure and the other end of said supporting member engaging said screen and the inner surface of said envelope to maintain said electrode structure in a given position with respect to said envelope.

5. An image converter tube for converting infrared radiation into visible radiation, comprising a hermetically sealed elongated vitreous envelope having at one end a first wall portion transparent to infrared radiation and having at the other end a second wall portion transparent to visible radiation, an infrared-responsive photocathode formed of silver and cesium and covering said first wall portion to emit electrons substantially proportional to the intensity of said infrared radiation at the respective points of impingement; a fluorescent screen on said second wall portion within said tube in axially spaced relation to said cathode, said screen being responsive to impinging electrons to emit visible rays proportional thereto, a substantially cylindrical electrode structure arranged in said envelope between said cathode and said screen, said electrode structure having one open end portion directed substantially toward said cathode, the other open end portion of said electrode structure being substantially directed toward said screen for focusing the electrons emitted by said cathode and directing the electrons towards said screen, whereby said screen produces a visible image of the rays of invisible radiation impinging on said cathode; and a frusto-conical supporting member of conductive metal electrically interconnecting said screen and said electrode structure and having an inner portion peripherally engaging said other end portion and an outer portion engaging said screen and the inner surface of said envelope to maintain said electrode structure in a given position with respect to said envelope.

6. In an image converter tube according to claim 1, said envelope having an integral reentrant internal portion, said electrode structure being substantially cylindrically shaped and being formed with flange portions at one end thereof, said flange portions being removably attached to said reentrant internal portion of said envelope, and said annular supporting member being located at the other end of said electrode structure.

References Cited in the file of this patent

UNITED STATES PATENTS

| | | |
|---|---|---|
| 1,647,591 | Van Voorhis | Nov. 1, 1927 |
| 1,670,892 | Koch | May 22, 1928 |
| 1,981,523 | Nolte | Nov. 20, 1934 |
| 2,037,099 | Taylor | Apr. 14, 1936 |
| 2,277,423 | Weinhart | Mar. 24, 1942 |
| 2,290,086 | Beldi | July 14, 1942 |
| 2,417,061 | Chilcot et al. | Mar. 11, 1947 |
| 2,487,665 | Morton et al. | Nov. 8, 1949 |
| 2,506,018 | Flory et al. | May 2, 1950 |
| 2,600,121 | McGee et al. | June 10, 1952 |
| 2,675,495 | De Lany et al. | Apr. 13, 1954 |
| 2,681,420 | Teves | June 15, 1954 |
| 2,803,770 | Harkensee | Aug. 20, 1957 |
| 2,841,728 | McGee | July 1, 1958 |

FOREIGN PATENTS

| | | |
|---|---|---|
| 879,434 | Germany | June 11, 1953 |
| 901,569 | Germany | Jan. 11, 1954 |